(12) United States Patent
Anders et al.

(10) Patent No.: US 7,154,300 B2
(45) Date of Patent: Dec. 26, 2006

(54) ENCODER AND DECODER CIRCUITS FOR DYNAMIC BUS

(75) Inventors: Mark A. Anders, Hillsboro, OR (US); Himanshu Kaul, Ann Arbor, MI (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 10/744,084

(22) Filed: Dec. 24, 2003

(65) Prior Publication Data
US 2005/0146357 A1 Jul. 7, 2005

(51) Int. Cl.
*H03K 19/0175* (2006.01)
*G06F 13/00* (2006.01)
*G11C 7/00* (2006.01)

(52) U.S. Cl. .......... 326/86; 326/93; 326/105; 710/110; 365/205

(58) Field of Classification Search ........ 326/105, 326/93, 95, 98
See application file for complete search history.

(56) References Cited

U.S. PATENT DOCUMENTS

| | | | |
|---|---|---|---|
| 3,820,031 A | 6/1974 | Smithlin | |
| 3,967,061 A | 6/1976 | Dobias | |
| 4,229,823 A | 10/1980 | Thomson et al. | |
| 4,453,229 A | 6/1984 | Schaire | |
| 4,525,848 A | 6/1985 | Simpson | |
| 4,663,767 A | 5/1987 | Bodlaj et al. | |
| 5,646,557 A | 7/1997 | Runyon et al. | |
| 6,005,417 A | 12/1999 | Mehta et al. | |
| 6,028,814 A | 2/2000 | Lim | |
| 6,140,843 A | 10/2000 | Howard | |
| 6,188,596 B1 | 2/2001 | Holst | |
| 6,333,645 B1 | 12/2001 | Kanetani et al. | |
| 6,351,150 B1 | 2/2002 | Krishnamurthy et al. | |
| 6,417,698 B1 * | 7/2002 | Williams et al. | 326/93 |
| 6,453,399 B1 | 9/2002 | Wada | |
| 6,559,680 B1 | 5/2003 | Bhushan et al. | |
| 6,717,448 B1 | 4/2004 | Heo et al. | |
| 6,741,094 B1 * | 5/2004 | Ogawa | 326/16 |
| 6,765,408 B1 * | 7/2004 | Cheng et al. | 326/41 |
| 6,894,536 B1 | 5/2005 | Martin et al. | |
| 6,990,035 B1 | 1/2006 | Redwine et al. | |
| 2001/0052797 A1 | 12/2001 | Bhushan et al. | |
| 2003/0001184 A1 | 1/2003 | Anders et al. | |
| 2003/0099300 A1 | 5/2003 | Anders et al. | |
| 2003/0107411 A1 | 6/2003 | Martin et al. | |

(Continued)

OTHER PUBLICATIONS

Anders et al., "A Transition-Encoded Dynamic Bus Technique for High-Performance Interconnects", IEEE Journal of Solid-State Circuits, vol. 38, No. 5, May 2003, pp. 709-714.

(Continued)

*Primary Examiner*—Vibol Tan
(74) *Attorney, Agent, or Firm*—Fleshner & Kim, LLP

(57) ABSTRACT

A dynamic bus architecture is provided. This may include an encoding circuit coupled to a bus line and a decoder circuit coupled to the bus line. The encoder circuit may receive an input signal and generate an encoded signal on the bus line. The decoder circuit may receive the encoded signal from the bus line and generate the original unencoded signal. The encoder circuit may include a first flip-flop circuit to store a previous input signal from the bus line based on a clocking signal from the bus line. Additionally, the decoder circuit may include a second flip-flop circuit having a clock input to receive the encoded signal from the bus line as a clocking input.

31 Claims, 8 Drawing Sheets

U.S. PATENT DOCUMENTS

2005/0285631 A1 12/2005 Goldman et al.
2006/0140034 A1 6/2006 Hsu et al.

OTHER PUBLICATIONS

Stan, Mircea R., et al., "Bus-Invert Coding for Low-Power I/O", IEEE Transactions on Very Large Scale Integration (VLSI) Systems, vol. 3, No. 1, pp. 49-58 (Mar. 1995), no date.

Stan, Mircea R., et al. "Coding a Terminated Bus for Low Power", Proceedings of the Fifth Great Lakes Symposium on VLSI, pp. 70-73 (Mar. 16-18, 1995).

Stan, Mircea R., et. al. "Low-Power Encodings for Global Communication in CMOS VLSI," IEEE Transactions on Very Large Scale Integration (VLSI) Systems, vol. 5, No. 4, pp. 444-455 (Dec. 1997), no date.

Anders, Mark, et al., "A Transition-Encoded Dynamic Bus Technique for High-Performance Interconects," Symposium on VLSI Circuits, Digest of Technical papers, pp. 16-17 (Jun. 13-15, 2002).

* cited by examiner

ENCODER AND DECODER CIRCUITS FOR DYNAMIC BUS

FIELD

Embodiments of the present invention may relate to interconnects. More particularly, embodiments of the present invention may relate to dynamic buses.

BACKGROUND

The length of interconnects between and within microprocessor data paths in functional blocks has increased as integration density has increased in integrated circuits (ICs). Because interconnect capacitance per unit length increases rapidly with lateral dimension scaling, long point-to-point interconnects may cause performance and power bottlenecks in ICs.

Dynamic buses may replace static buses for speed-critical on-chip interconnects due to the increasing interconnect delays and reduced cycle times associated with successive technology generations. Dynamic CMOS interconnect drivers have been substituted for static CMOS drivers in high performance on-chip busses. For example, in busses having static drivers, when neighboring wires switch in opposite directions, e.g., from Vss to Vcc on one wire and from Vcc to Vss on the neighboring wire, the voltage swing on the parasitic capacitor that inherently exists between the two wires is not Vcc-Vss. Rather, the voltage swing seen by the parasitic capacitor is doubled to (Vcc-Vss)*2. Therefore the effective capacitance to ground seen by the wire is doubled, yielding a Miller Coupling Factor (MCF) of 2.0.

However, in busses having dynamic drivers, all wires may be reset to a pre-charge state (for example, Vss) in a pre-charge portion of the clock cycle, and then may either remain at that state or switch to an opposite state (Vcc in this example) in an evaluate portion of the cycle. Since all wires in the bus are pre-charged to the same state, two neighboring wires cannot switch in opposite directions from the pre-charge state during evaluation, and a maximum voltage swing on the terminals of the parasitic capacitor between the two wires will be (Vcc-Vss). The MCF is thereby reduced from 2.0 in static CMOS drivers to 1.0 in dynamic CMOS drivers, thereby reducing a large component of the wire's worst-case effective coupling capacitance.

Dynamic buses offer reduced interconnect delays over static buses due to the fact that the Miller coupling factor reduces from a worst-case scenario of 2 (for static buses) to 1. The reduced effective switching capacitance on dynamic buses may result in much lower delays. However, dynamic buses may consume considerable power even at low input switching activities (such as in microprocessor buses) because the switching activity now depends upon the state of the data.

BRIEF DESCRIPTION OF THE DRAWINGS

The foregoing and a better understanding of the present invention will become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION

Figure 1:
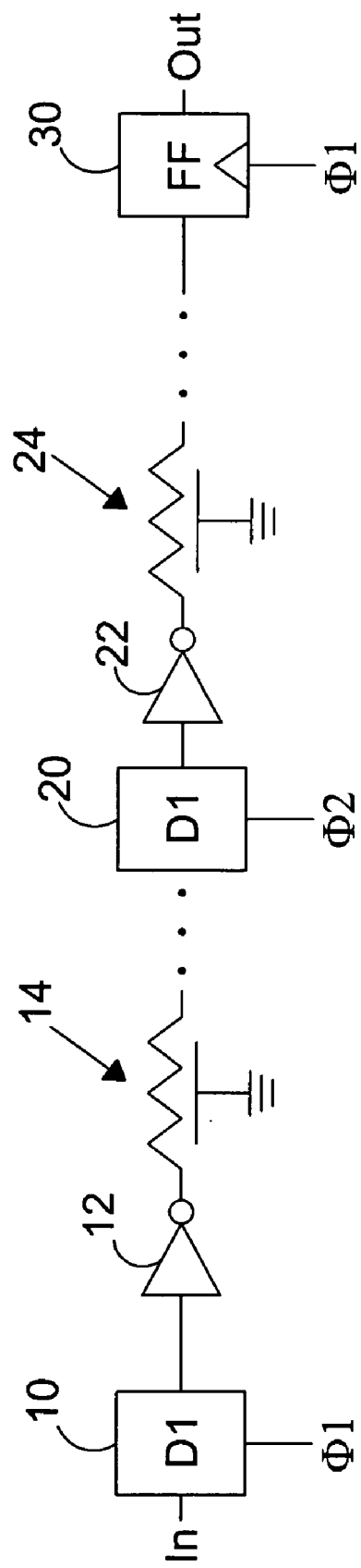
FIG. 1 shows a dynamic driver-based bus architecture according to an example arrangement.

In the following detailed description, like reference numerals and characters may be used to designate identical, corresponding or similar components in differing figure drawings. Further, in the detailed description to follow, example sizes/models/values/ranges may be given although the present invention is not limited to the same. Well-known power/ground connections to integrated circuits (ICs) and other components may not be shown within the FIGS. for simplicity of illustration and discussion. Further, arrangements and embodiments may be shown in block diagram form in order to avoid obscuring the invention, and also in view of the fact that specifics with respect to implementation of such block diagrams may be dependent upon the platform within which the present invention is to be implemented. That is, the specifics are well within the purview of one skilled in the art. Where specific details are set forth in order to describe example embodiments of the invention, it should be apparent to one skilled in the art that the invention can be practiced without these specific details.

Further, while values or signals may be described as HIGH ("1") or LOW ("0"), these descriptions of HIGH and LOW are intended to be relative to the discussed arrangement and/or embodiment. That is, a value or signal may be described as HIGH in one arrangement although it may be LOW if provided in another arrangement, such as with a change in logic. The terms HIGH and LOW may be used in an intended generic sense. Embodiments and arrangements may be implemented with a total/partial reversal of the HIGH and LOW signals by a change in logic.

Examples will now be described with respect to a voltage Vss being LOW (or GROUND) and a voltage Vcc being HIGH. These are merely exemplary as other voltages may be used. Arrangements and embodiments may also be described with respect to signals being input or output from different circuit components. It is understood that while the discussion identifies a signal, the signal may be transmitted over a signal line or similar type of mechanism. Further, the terminology signal may also correspond to a signal line as shown in the drawings.

Embodiments of the present invention may include a dynamic bus architecture that includes an encoder circuit and/or a decoder circuit coupled to a bus line (such as on a chip). The encoder circuit may generate an encoded signal on the bus line in response to a transition between a current input signal and a previous input signal. The encoder circuit may include a flip-flop circuit to store a previous input signal from the bus line. The encoder circuit may also include a sense amplifier, two transmission gates to pass output signals from the sense amplifier and a driving transistor. The decoder circuit may include a flip-flop circuit to receive an encoded signal from the bus line as a clocking signal and to output an unencoded signal based on the clocking signal. The decoder circuit may also include a toggle flip-flop circuit to store a value corresponding to the output of the flip-flop circuit of the decoder.

FIG. 1 shows a dynamic driver-based bus architecture according to an example arrangement. Other arrangements are also possible. More specifically, FIG. 1 shows a dynamic driver 10 at an input node and a clocked flip-flop (FF) circuit 30 at an output node of a bus line. A dynamic bus repeater 20 provided in a middle of the bus line, for example, may divide the bus line into a front segment and a rear segment. The front segment may include an inverter 12 and a wire interconnect 14. The rear segment may include an inverter 22 and a wire interconnect 24. Other segments and components of the bus line are not shown for ease of illustration and discussion.

The dynamic driver 10 and the flip-flop circuit 30 are clocked by a $\Phi 1$ clock. The dynamic bus repeater 20 is clocked by a $\Phi 2$ clock. Each clock splits a clock cycle into a precharge phase and an evaluate phase. In the precharge phase, the output node of the circuits in the dynamic bus are "pre-charged" to Vcc or Vss (alternating between inverting stages). In the evaluate phase, the output node of each circuit is conditionally charged to Vcc (or discharged to Vss) based on its input. Thus, during the evaluate phase each circuit will either transition between Vcc and Vss or be quiescent.

Since the power consumption of dynamic buses is not switching-activity dependent, a transition encoded dynamic bus technique may be used to reduce the power consumption (as compared to domino buses, for example). A transition encoded dynamic bus may evaluate only when the input has transitioned. A transition encoded type of bus may utilize an encoder circuit (or device) at a driver end of the bus line and a decoder circuit (or device) at an input of the receiver flip-flop, such as the flip-flop circuit 30.

Figure 2:
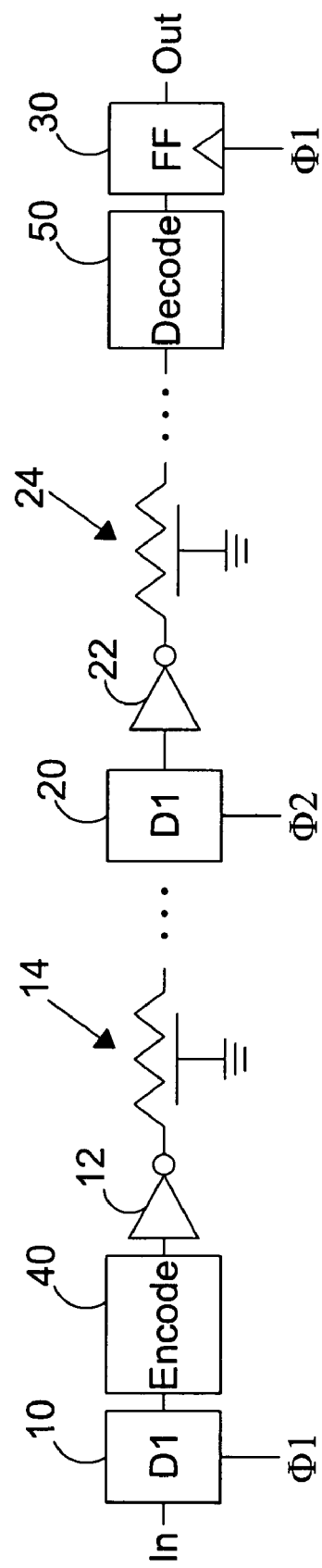
FIG. 2 shows a transition encoded dynamic bus architecture according to an example arrangement.

FIG. 2 shows a transition encoded dynamic bus architecture according to an example arrangement. Other arrangements are also possible. More specifically, FIG. 2 shows an encoder circuit 40 provided at a front end of the bus line coupled to the output node of the dynamic driver 10. A decoder circuit 50 is provided at a rear end of the bus line coupled to the input node of the FF circuit 30. The encoder circuit 40 translates transition activity at an input into an output logic state. For example, instead of a LOW input causing a LOW output, a LOW output of the encoder circuit 40 in an exemplary transition-encoding scheme may indicate that no transition has occurred on the input. Additionally, a HIGH output of the encoder circuit 40 may indicate that the input has transitioned from LOW to HIGH, or from HIGH to LOW in the exemplary encoding scheme. The decoder circuit 50 may then use this encoded signal to reconstruct the original input to the encoder circuit 40. By hiding the actual input value from the rest of the bus line and only indicating a transition on the input, the power consumed by the dynamic bus may be reduced because of typically low switching activities. However, encoder and decoder circuits may result in delay for dynamic buses.

Figure 3:
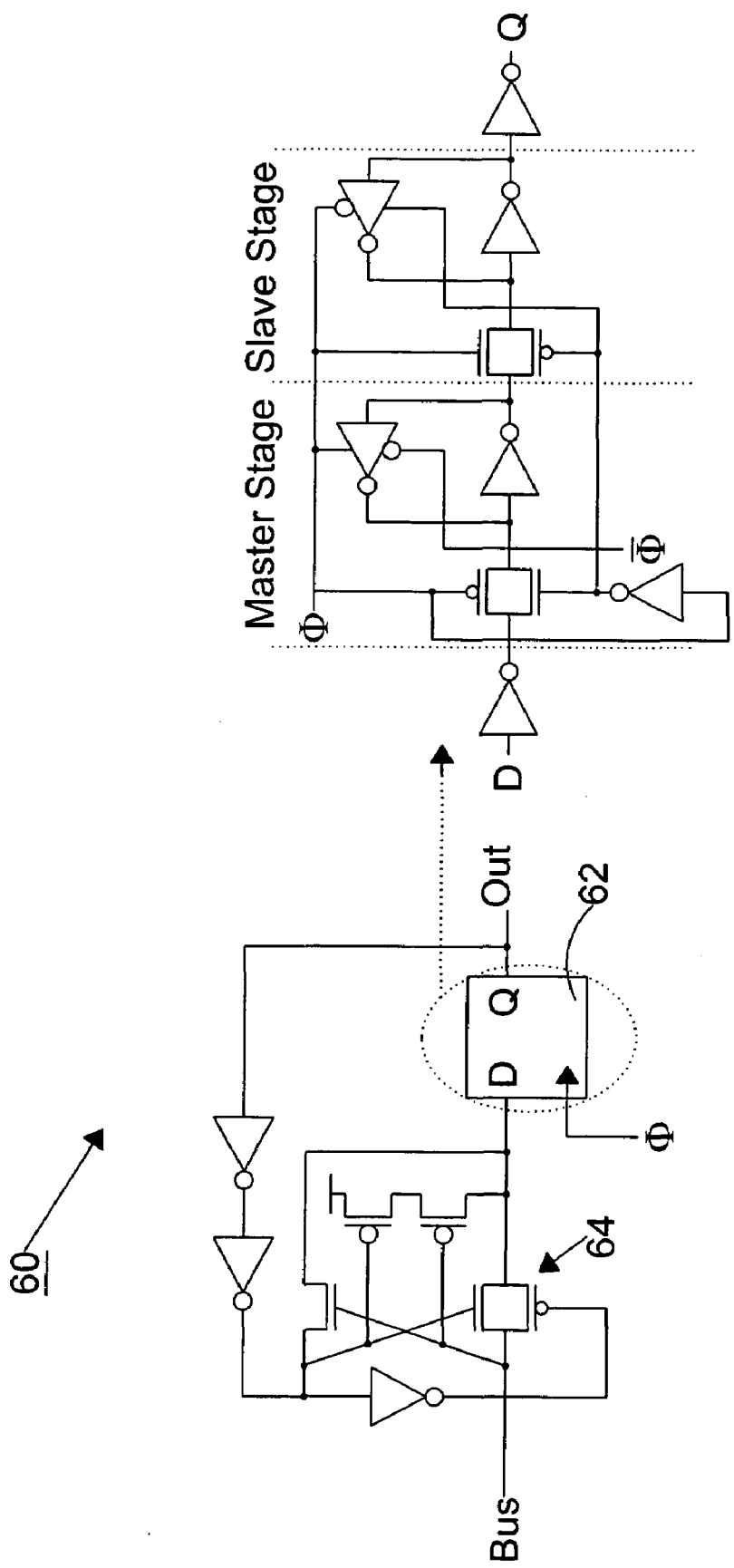
FIG. 3 shows a decoder circuit according to an example arrangement.

FIG. 3 shows a decoder circuit 60 according to an example arrangement. Other arrangements are also possible. The decoder circuit 60 shown in FIG. 3 may be provided at the end of a bus line, such as shown by the decoder circuit 50 in FIG. 2. The decoder circuit 60 may include a plurality of components to act as an XOR circuit that allows signals to pass to a flip-flop circuit 62. The flip-flop circuit 62 stores an encoded signal input from the bus from a previous cycle. The right hand side of FIG. 3 shows a circuit diagram of the flip-flop circuit 62 including a master stage and a slave stage. Other configurations are also possible.

Depending on the previous signal on the bus line, the input signal on the bus (labelled Bus) may pass through a transmission gate 64 to the D input of the flip-flop circuit 62. In other words, the D input represents the unencoded data from the bus line. The flip-flop circuit 62 is clocked by the $\Phi$ signal, which hides the pre-charge signal placed on the bus each cycle from the flip-flop circuit 62, and hence the decoder circuit 60. No system clock is required for the decode operation (i.e., the XOR logic operation), but rather the output of the decoder circuit 60 transitions whenever a "1" (or HIGH) is received on the bus and the output of the decoder circuit 60 remains the same as long as the bus remains "0" (or LOW). In other words, the output of the decoder circuit 60 (i.e., the Q output of the flip-flop circuit 62) transitions each cycle in which the signal on the input to the bus transitions. This is a result of the XOR logic operation of the components.

Embodiments of the present invention may include a decoder circuit that includes a first flip-flop circuit to store an encoded value and including a clock input to receive an encoded signal from the bus line as a clocking signal. The first flip-flop circuit to output an unencoded signal based on the clocking signal. The decoder circuit may also include a second flip-flop circuit to store a value corresponding to the output of the first flip-flop circuit.

Figure 4:
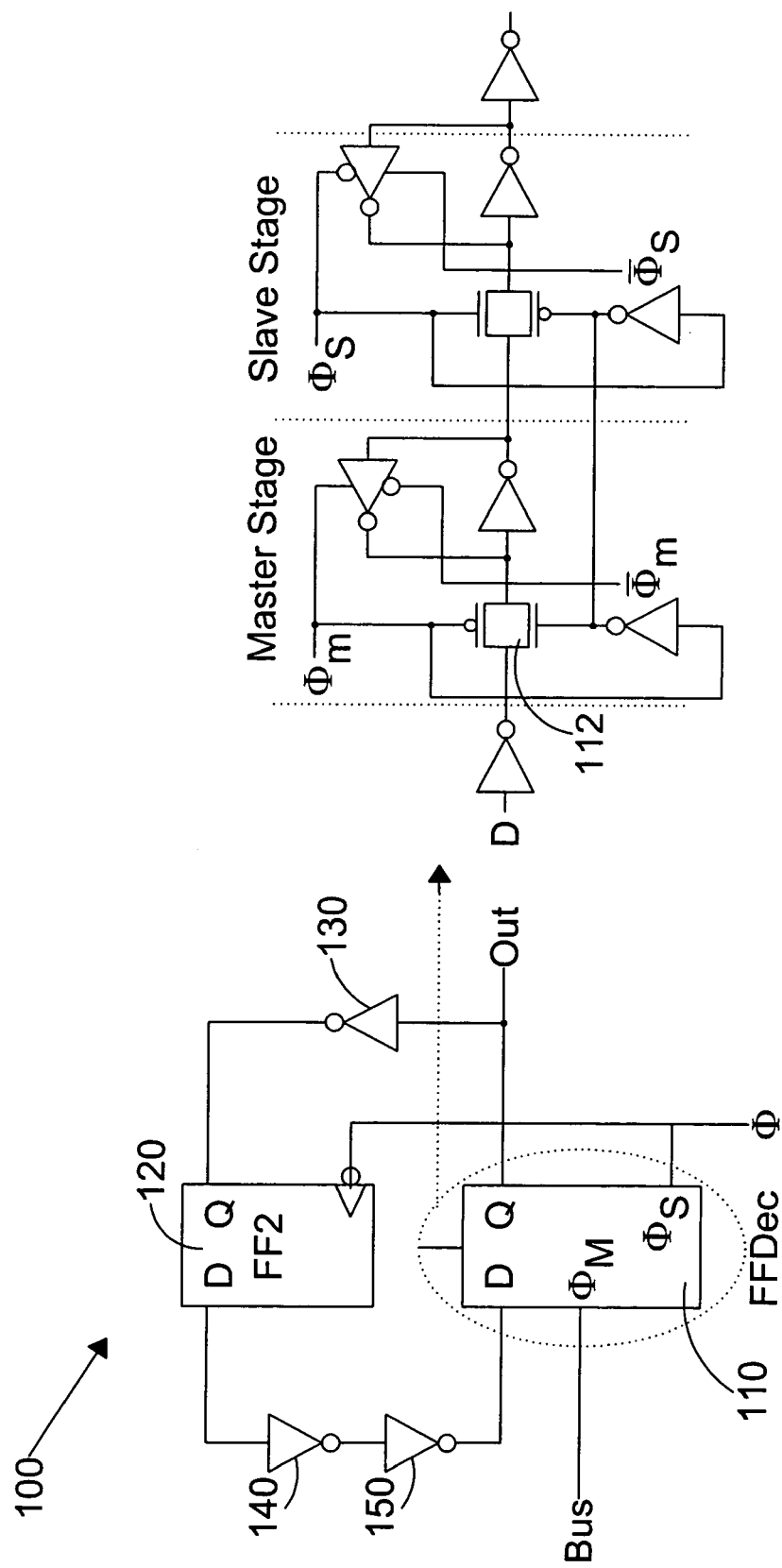
FIG. 4 shows a decoder circuit according to an example embodiment of the present invention.

FIG. 4 shows a decoder circuit 100 according to an example embodiment of the present invention. Other embodiments and configurations are also within the scope of the present invention. The decoder circuit 100 may be provided at the end of a bus line, such as shown by the decoder circuit 50 in FIG. 2. The decoder circuit 100 may include a flip-flop (FFDec) circuit 110, a flip-flop (FF2) circuit 120 and inverters 130, 140 and 150. The right hand side of FIG. 4 shows a circuit diagram of the flip-flop circuit 110 including a master stage and a slave stage. The flip-flop circuit 110 may also be called a decoder flip-flop circuit. This type of circuit may remove the decoder circuit (i.e., the XOR circuit) from a critical path and still achieve a similar type of delay as a bus having a receiver flip-flop circuit.

The flip-flop circuit 110 receives a signal on the bus as a clock input $\Phi_m$ to the flip-flop circuit 110. That is, the signal on the bus is used as timing for the master stage of the flip-flop circuit 110. An inverted value of the output of the flip-flop circuit 110 is applied to the D input of the flip-flop circuit 110 (based on the flip-flop circuit 120 and the inverters 130, 140 and 150). However, the inverted value is "written" into the master stage only when the bus evaluates (i.e., the bus transitions to Vss or LOW). The new data value is available at the Q output of the flip-flop circuit 110 only when the clocked signal transitions to Vcc or HIGH.

The flip-flop circuit 120 may be a negative edged triggered flip-flop circuit used to prevent any race condition that can occur when both stages of the flip-flop circuit 110 are transparent. That is, the flip-flop circuit 120 is a falling edge circuit that latches based on the previous output. Due to the inverter 130, the flip-flop circuit 120 latches the opposite value of the previous output. For example, when the bus transitions back to Vcc (or HIGH) in the pre-charge phase, a transmission gate 112 of the master stage is closed and both stages store the same data. When the bus does not discharge in the evaluate phase, the data at the clock output does not change.

The decoder circuit 100 in FIG. 4 has power advantages over other arrangements in that the delay through an XOR circuit is eliminated and/or reduced.

The decode mechanism may be embedded within the timing of the flip-flop circuit 110. The new (inverted) data to the input of the flip-flop circuit 110 is stable before the bus discharges during the evaluation phase. The bus signal may be used as the timing signal of the master stage of the flip-flop circuit 110 such that the data may be written into the master stage when the bus goes LOW (or to Vss). This type of decoding scheme may reduce or eliminate the delay resulting from the decode circuit shown in FIG. 3.

The independence of the timing signal to the stages of the flip-flop circuit 110 allows time-borrowing and makes the design more robust towards clock skew and jitter than disadvantageous designs. Further, in disadvantageous arrangements, the nodes belonging to the clock network of the master stage may switch in every clock cycle. The flop-embedded decoder (i.e., the flip-flop circuit 110) may reduce the clock power consumption in the flip-flop by letting the clock signal only clock the slave stage. The switching activities of the clock nodes of the master stage may be dependent on the data switching activity, which may be low.

Embodiments of the present invention may also be applicable to drivers and more particularly to multi-source drivers of dynamic buses as will now be discussed.

Multi-source dynamic buses include a plurality of driving points (or drivers). Each driver may have its own individual pull down network. The bus may further have a pull up network for pre-charge operation. Control signals may ensure that only one of the pull-down networks may cause the bus to conditionally discharge in any cycle.

Figure 5:
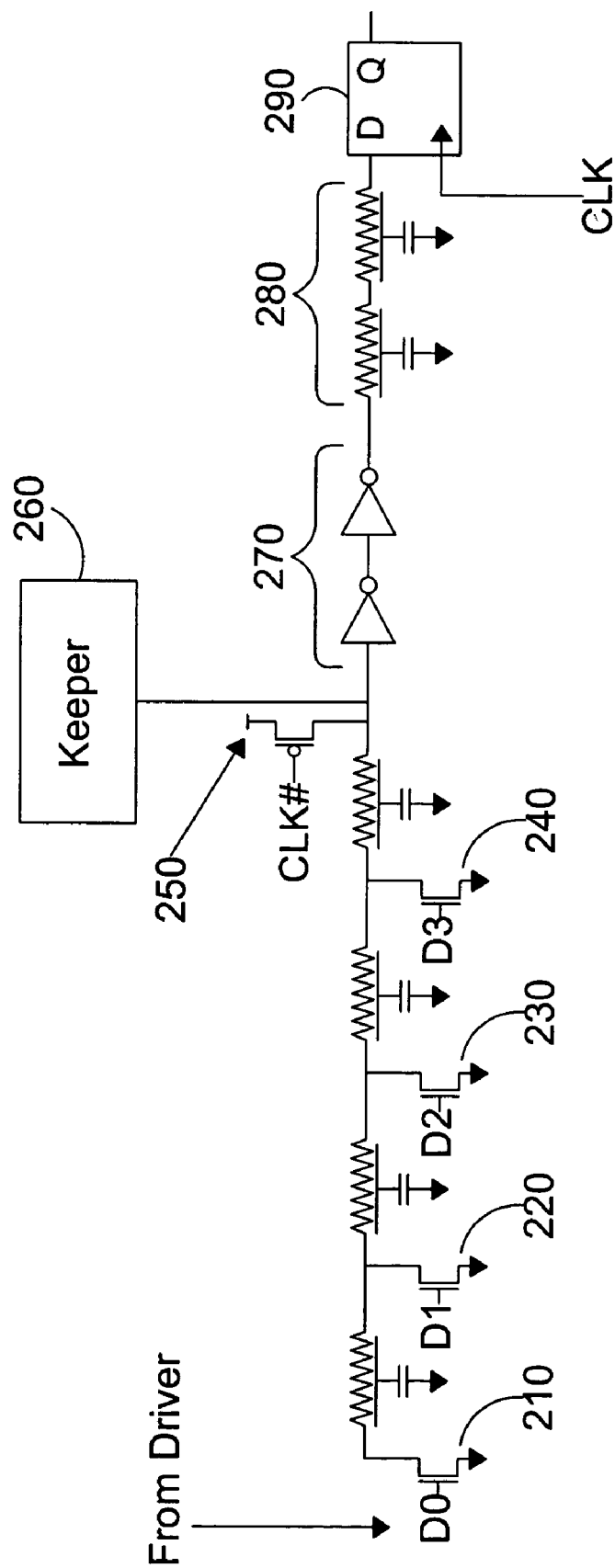
FIG. 5 shows a multi-source dynamic bus architecture according to an example arrangement.

FIG. 5 shows a multi-source dynamic bus architecture according to an example arrangement. Other arrangements are also possible. More specifically, FIG. 5 shows a plurality of driving transistors 210, 220, 230 and 240 that are driven by signals D0, D1, D2 and D3, respectively. The signals D0, D1, D2 and D3 may come from a control device or driver circuit. Each of the driving transistors 210, 220, 230 and 240 may be coupled to the bus line at one of various locations so as to drive the bus line in parallel. A pull-down network may include a precharge circuit 250 and keeper circuit 260 that operate to perform precharge operations. The bus may further include a plurality of inverters 270 and interconnect portions 280 prior to a decoder circuit 290. The decoder circuit 290 may correspond to one of the decoder circuits discussed above or may be a different type of decoder circuit. In other words, FIG. 5 shows a multi-source bus with a repeater stage and a receiver flip-flop. This type of bus may be used for cache buses (such as from a cache to a bus on a chip), for example.

Figure 6:
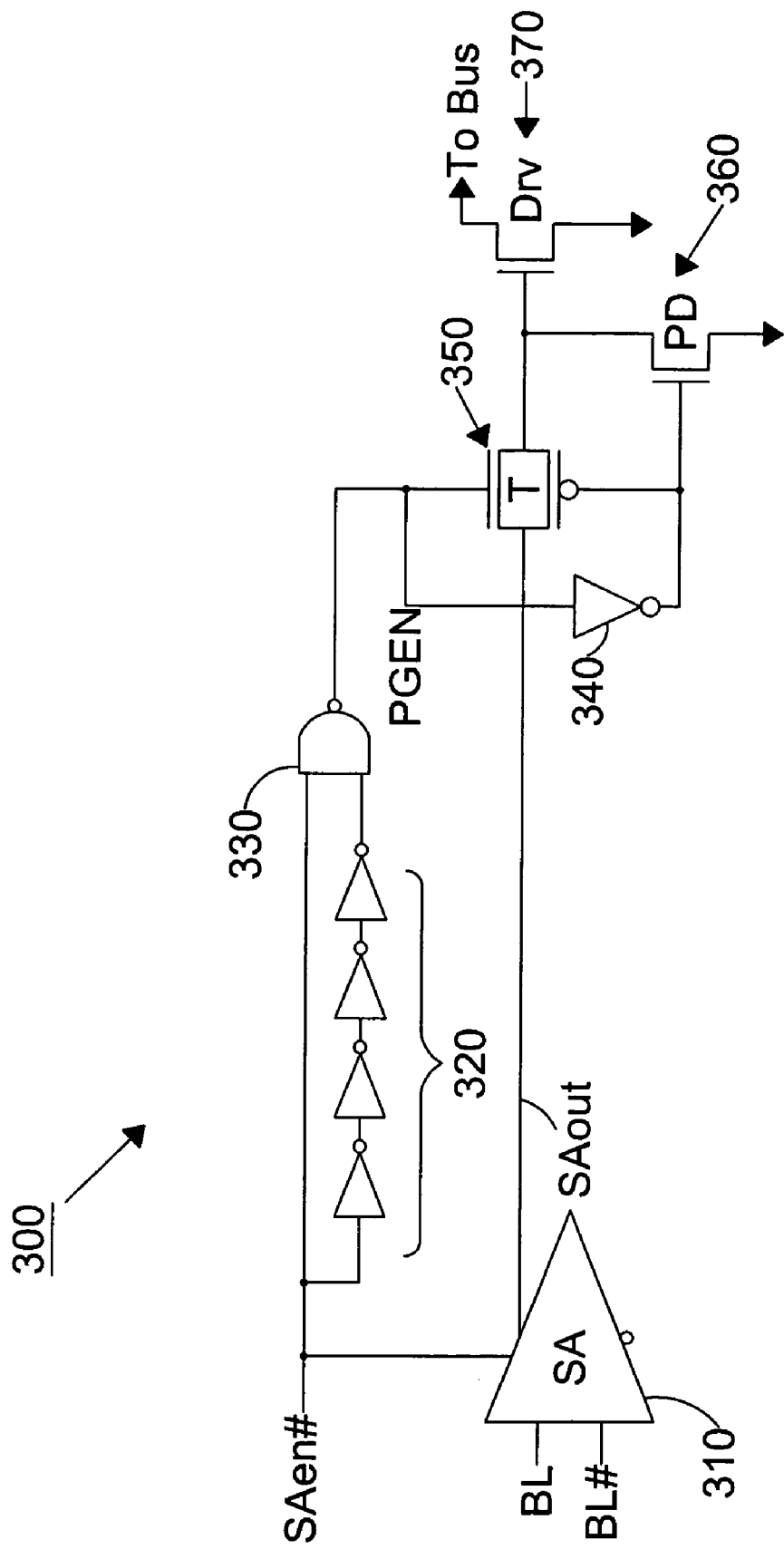
FIG. 6 shows a driver/encoder circuit according to an example arrangement.

FIG. 6 shows a driver/encoder circuit 300 according to an example arrangement. Other arrangements are also possible. FIG. 6 represents one of the drivers 210, 220, 230 and 240 shown in FIG. 5, for example. FIG. 6 will be described with respect to the driving transistor 210. Although not shown, each of the other drivers/encoders of the multi-source architecture may not be enabled while the driving transistor 210 is enabled.

As shown, a sense amplifier 310 may receive input signals along bit lines BL and BL# (from cells, for example). An output of the sense amplifier 310 may pass through a transmission gate (or pass gate) 350 to drive a driving (Drv) transistor 370 coupled to the bus (at the node labelled To Bus). More specifically, the sense amplifier 310 may sense and amplify data on the differential bit lines BL and BL# from a cache, for example, or other type of device (or storage medium). A saen# signal may enable the sense-amplifier 310. The sense amplifier 310 may produce differential outputs. In FIG. 6, only the true signal (SAout) of the sense amplifier 310 may be used. During the evaluate phase, if a particular driver (such as the driver 210 of FIG. 5) is enabled, the saen# signal transitions from Vcc to Vss, which causes a pass gate enable signal PGEN to go HIGH based on the inverters 320 and NAND gate 330.

When the PGEN signal goes HIGH, the transmission gate 350 is turned ON to allow signal SAout to pass through the transmission gate 350. At substantially the same time, a pull down (PD) transistor 360 is turned OFF based on the PGEN signal passing through inverter 340 to a gate of pull down transistor 360. When the output of the sense amplifier 310 goes HIGH (i.e., data is a "1") during the evaluate phase, node D0 transitions to Vcc (or HIGH), causing the driving transistor 370 to pull the bus to Vss (or LOW). When the bus enters the pre-charge phase, the saen# signal transitions back to Vcc. This causes the PGEN signal to go LOW, which turns OFF the transmission gate 350 and causes the pull down transistor 360 to turn ON. This action further turns OFF the driving transistor 370, thus resulting in a "0" to be output from the driving transistor 370 (on the node labelled To Bus).

Embodiments of the present invention may include an encoder (or driver/encoder) circuit that receives an input signal and generates an encoded signal on the bus line in response to a transition between a current input signal and a previous input signal. The encoder circuit may include a toggle flip-flop circuit to store a previous input signal from the bus line. The encoder circuit may also include a sense amplifier, transmission gates and a driving transistor coupled such that a first transmission device passes a first output signal from the sense amplifier to the driving transistor based on an output of the flip-flop circuit, and such that a second transmission device passes a second output signal from the sense amplifier to the driving transistor based on an output of the toggle flip-flop circuit.

Embodiments of the present invention may provide an efficient encoding mechanism within a driver circuit that will provide features of an encoder circuit of a transition encoded dynamic bus and at the same time allow for multiple drivers on the bus.

Figure 7:
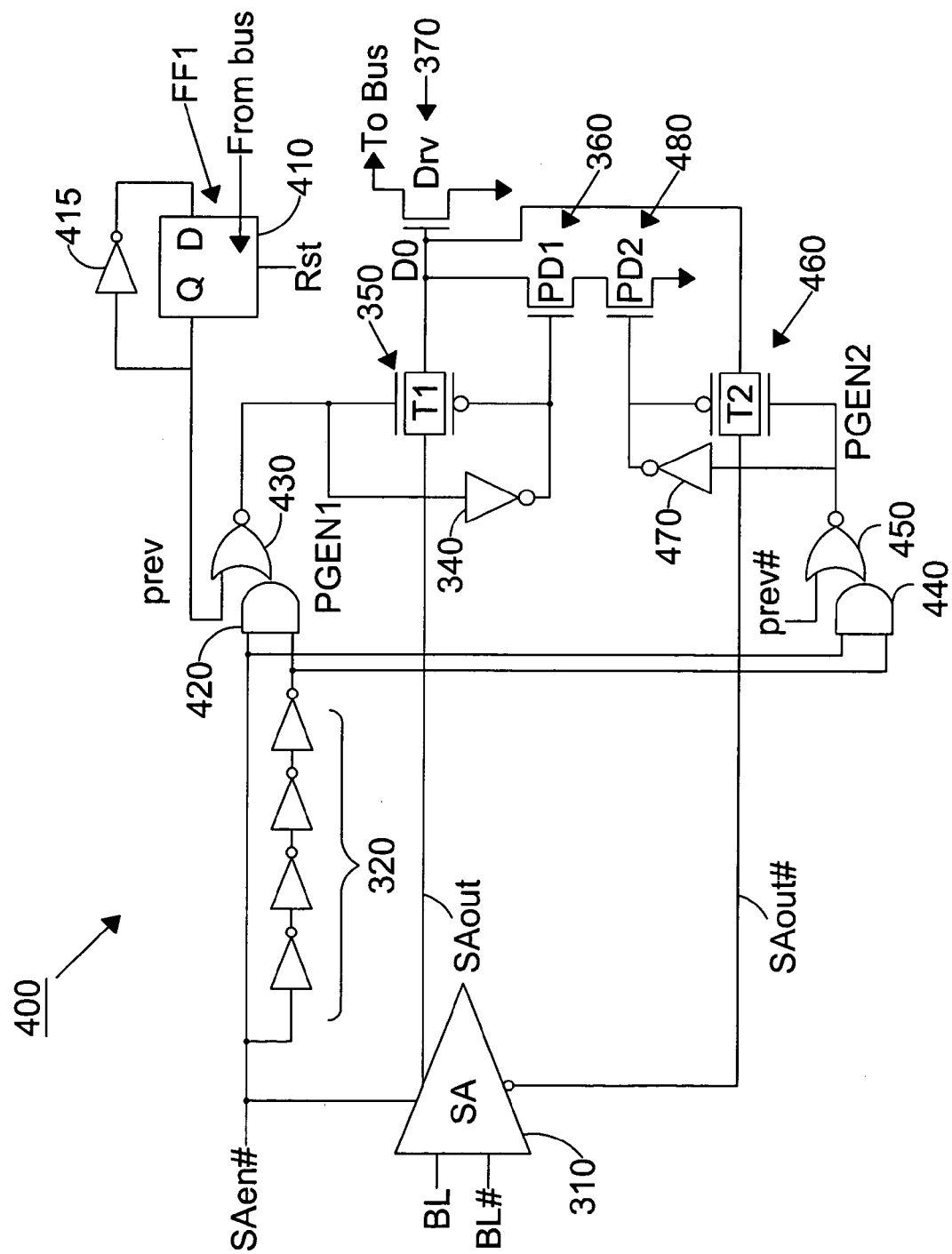
FIG. 7 shows a driver/encoder circuit according to an example embodiment of the present invention.

FIG. 7 shows a circuit diagram of a driver/encoder circuit 400 according to an example embodiment of the present invention. Other embodiments and configurations are also within the scope of the present invention. FIG. 7 represents one of the drivers 210, 220, 230 and 240 shown in FIG. 5, for example. FIG. 7 will be described with respect to the driving transistor 210. Although not shown, each of the other drivers/encoders of the multi-source architecture may not be enabled while the driving transistor 210 is enabled.

The driver/encoder circuit 400 includes the sense amplifier 310, the inverters 320 and 340, the transmission gate 350, the pull down transistor 360 and the driver transistor 370, which were discussed above with respect to FIG. 6. The driver/encoder circuit 400 may also include a toggle flip-flop circuit 410 and an inverter 415. Further, an AND gate 420 and a NOR gate 430 may be associated with a pass gate enable signal PGEN1 along with the inverter 340, the transmission gate 350 and the pull down transistor 360. Even still further, an AND gate 440 and a NOR gate 450 may be associated with a pass gate enable signal PGEN2 along with an inverter 470, a transmission gate 460 and a pull down (PD2) transistor 480. These components operate to perform an XOR function by comparing a previous value on the bus with a current value on the bus. If the values are different, then the driving circuit 400 performs both an evaluate phase and a precharge phase.

The saen# signal and an output of the inverters 320 are input to each of the AND gates 420 and 440. An output of the AND gate 420 and a prev signal (from the toggle flip-flop circuit 410) are input to the NOR gate 430. An output of the AND gate 440 and a prev# signal (from the flip-flop circuit 410) are input to the NOR gate 450.

The NOR gate 430 outputs the PGEN1 signal to the inverter 340 and the transmission gate 350. When the PGEN1 signal goes HIGH, the transmission gate 350 is turned ON to allow signal SAout to pass through the transmission gate 350. At substantially the same time, the pull down transistor 360 is turned OFF based on the signal PGEN1 passing through the inverter 340 to a gate of the pull down transistor 360. On the other hand, the NOR gate 450 outputs the PGEN2 signal to the inverter 470 and the transmission gate 460. When the PGEN2 signal goes HIGH, the transmission gate 460 is turned ON to allow signal SAout# to pass through the transmission gate 460. At substantially the same time, the pull down transistor 480 is turned OFF based on the signal PGEN2 passing through the inverter 470 to a gate of the pull down transistor 480.

The transmission gate 350 passes the SAout signal to the driving transistor 370 based on the PGEN1 signal. Likewise, the transmission gate 460 passes the SAout# signal to the driving transistor 370 based on the PGEN2 signal. The signal driven by the driving transistor 370 is applied to the bus (labelled To Bus).

The toggle flip-flop circuit 410 may store a state of a last value that was transmitted on the bus. The toggle flip-flop circuit 410 may be reset to a same state as the receiver flip-flop circuit (such as the flip-flop circuit 290 shown in FIG. 5). The flip-flop circuit 410 may also be clocked by the bus (labelled From Bus). The flip-flop circuit 410 operates as a toggle flip-flop in that it changes an output everytime a transition occurs on the bus. For example, the flip-flop circuit 410 output changes from outputting a "0" to outputting a "1" when a transition occurs on the bus, and the output changes from outputting a "1" to outputting a "0" when a transition occurs on the bus. Thus, the Q output (labelled prev) represents the correct data of the previous cycle. More specifically, on a positive transition of the bus, the output (labelled Q) of the toggle flip-flop circuit 410 toggles, which is consistent with data encoding on the bus. That is, the bus discharges only when input data toggles. Based on the output of the toggle flip-flop circuit 410, a transition to LOW of the saen# signal causes the transmission gate 350 or the transmission gate 460 to be turned ON, thereby allowing the corresponding signal SAout or SAout# to pass through the corresponding transmission gate 350 or 360, respectively, to the driving transistor 370. The last data (labelled prev) sent on the bus is output from the Q output of the toggle flip-flop circuit 410. For example, if the last data sent on the bus was a "0", then only the true output (SAout) of the sense amplifier 310 is connected to the gate of the driving transistor 370 through the transmission gate 350 when saen# is LOW. This causes the driving transistor 370 to pull the bus LOW only when the output from the sense amplifier 310 is a "1" (i.e., different from the last data sent on the bus). On the other hand, if the last data sent on the bus (i.e., prev) was a "1", then only the complemented output (SAout#) of the sense amplifier 310 is connected to the gate of the driving transistor 370 through the transmission gate 460 when saen# is LOW. This causes the driving transistor 370 to pull the bus LOW only when the output from the sense amplifier 310 is a "0" (i.e., different from the last data sent on the bus).

Although not shown in this figure, when saen# is HIGH for the driver/encoder shown in FIG. 7, another one of the drivers of the multi-driver architecture may be enabled and this driver/encoder would be disabled. Each of the other drivers/encoders of the multi-source architecture may include a similar type of driver/encoder as shown in FIG. 7.

Embodiments of the present invention may efficiently use the complemented outputs of the sense amplifier 310 so that no extra logic is added in a critical path of the data signal to accomplish the encoding. Furthermore, the encoded driver circuit may not add any additional delay in the data signal path. This allows for considerable power consumption reduction at the same delay as other arrangements. The encoded driver may also allow operation on busses with multiple driver sources.

Figure 8:
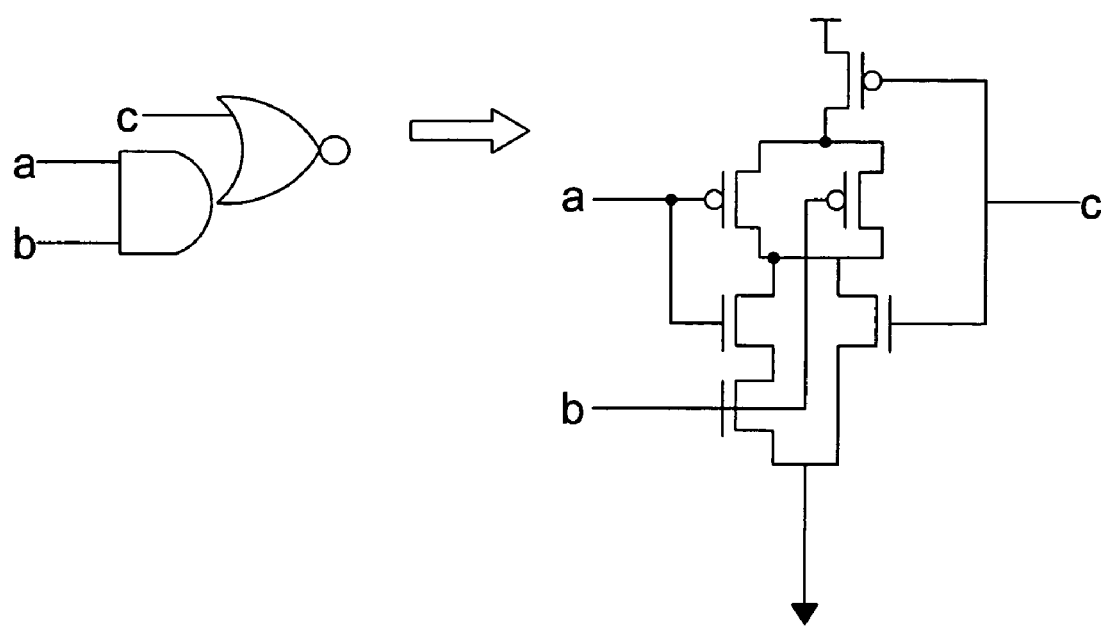
FIG. 8 shows a circuit diagram according to an example embodiment of the present invention.

FIG. 8 shows a circuit diagram of an AND gate and a NOR gate according to an example embodiment of the present invention. Other embodiments and configurations are also within the scope of the present invention. More specifically, FIG. 8 shows an example of the AND gate 420 and the NOR gate 430 (or the AND gate 440 and the NOR gate 450) of FIG. 7. This is merely one example as other types of logical components and circuits are also possible.

Since switching activity of the bus may be similar to a static CMOS bus, interconnect dynamic power may drop linearly with reducing bus switching activity. The interconnect capacitance may be switched only when input data transitions, otherwise the bus remains quiescent. This may represent a substantial savings in energy when compared to disadvantageous dynamic bus approaches because such schemes may pre-charge and evaluate the bus every cycle independent of the input data activity, thereby contributing to a large dynamic power loss at low input data activities.

Embodiments of the present invention may relate to any one of a number of electronic systems. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A dynamic bus comprising:
   a bus line;
   an encoder circuit coupled to the bus line, the encoder circuit to receive an input signal and to generate an encoded signal on the bus line in response to a transition between a current input signal and a previous input signal, the encoder circuit including a flip-flop circuit to store a previous input signal from the bus line, the encoder circuit further including a sense amplifier to provide a first output signal and a second output signal based on signals on bit lines, the second output signal being a complement of the first output signal; and
   a decoder circuit coupled to the bus line.

2. The dynamic bus of claim 1, wherein the flip-flop circuit comprises a toggle flip-flop circuit to store the previous input signal from the bus.

3. The dynamic bus of claim 2, wherein the toggle flip-flop circuit changes an output value when an input to the toggle flip-flop circuit changes.

4. The dynamic bus of claim 2, wherein the toggle flip-flop circuit includes a clock input to receive a signal from the bus line as a clocking signal such that an output value changes based on signals on the bus line.

5. The dynamic bus of claim 1, wherein the encoder circuit further includes a driving transistor coupled to the bus line to provide the encoded signal to the bus line.

6. The dynamic bus of claim 5, wherein the encoder circuit further includes a first transmission device to pass the first output signal from the sense amplifier to the driving transistor based on an output of the flip-flop circuit, and a second transmission device to pass the second output signal from the sense amplifier to the driving transistor based on an output of the flip-flop circuit.

7. The dynamic bus of claim 1, wherein the encoder circuit comprises a multi-driver/encoder circuit.

8. The dynamic bus of claim 1, wherein the decoder circuit comprises:
   a first flip-flop circuit to store an encoded value, the first flip-flop circuit including a clock input to receive an encoded signal from the bus line as a clocking signal, the first flip-flop circuit to output an unencoded signal based on the clocking signal; and
   a second flip-flop circuit to store a value corresponding to the output of the first flip-flop circuit.

9. The dynamic bus of claim 8, wherein the second flip-flop circuit comprises a negative edged triggered flip-flop circuit.

10. The dynamic bus of claim 8, wherein the first flip-flop circuit receives the encoded signal corresponding to a previous value on the bus line as an input.

11. The dynamic bus of claim 8, wherein the unencoded signal output from the first flip-flop device corresponds to an actual unencoded data value.

12. A dynamic bus comprising:
    a bus line;
    a decoder circuit coupled to the bus line, the decoder circuit including:
    a first flip-flop circuit to store an encoded value, the first flip-flop circuit including a clock input to receive an encoded signal from the bus line as a clocking signal, the first flip-flop circuit to output an unencoded signal based on the clocking signal, and
    a second flip-flop circuit to store a value corresponding to the output of the first flip-flop circuit; and
    an encoder circuit coupled to the bus line.

13. The dynamic bus of claim 12, wherein the second flip-flop circuit comprises a negative edged triggered flip-flop circuit.

14. The dynamic bus of claim 12, wherein the first flip-flop circuit receives the encoded signal corresponding to a previous value on the bus line as an input.

15. The dynamic bus of claim 12, wherein the unencoded signal output from the first flip-flop circuit corresponds to an actual unencoded data value.

16. The dynamic bus of claim 12, wherein the encoder circuit receives an input signal and generates an encoded signal on the bus line in response to a transition between a current input signal and a previous input signal, the encoder circuit including a toggle flip-flop circuit to store a previous input signal from the bus line.

17. The dynamic bus of claim 16, wherein the toggle flip-flop circuit changes an output value when an input to the toggle flip-flop changes.

18. The dynamic bus of claim 16, wherein the toggle flip-flop circuit includes a clock input to receive a signal from the bus line as a clocking signal such that an output value changes based on signals on the bus line.

19. The dynamic bus of claim 16, wherein the encoder circuit further includes a sense amplifier to provide a first output signal and a second output signal based on signals on bit lines, the second output signal being a complement of the first output signal.

20. The dynamic bus of claim 19, wherein the encoder circuit further includes a driving transistor coupled to the bus line to provide the encoded signal to the bus line.

21. The dynamic bus of claim 20, wherein the encoder circuit further includes a first transmission device to pass the first output signal from the sense amplifier to the driving transistor based on an output of the toggle flip-flop circuit, and a second transmission device to pass the second output signal from the sense amplifier to the driving transistor based on an output of the toggle flip-flop circuit.

22. The dynamic bus of claim 16, wherein the encoder circuit comprises a multi-driver/encoder circuit.

23. A chip comprising:
    a bus line;
    an encoder circuit coupled to the bus line; and
    a decoder circuit coupled to the bus line, the encoder circuit to receive an input signal and to generate an encoded signal on the bus line, the decoder circuit to receive the encoded signal from the bus line, the encoder circuit including a first flip-flop circuit to store a previous input signal from the bus line based on a clocking signal from the bus line, the decoder circuit including a second flip-flop circuit having a clock input to receive the encoded signal from the bus line as a clocking input.

24. The chip of claim 23, wherein the first flip-flop circuit includes a clock input to receive a signal from the bus line as a clocking signal such that an output value changes based on signals on the bus line.

25. The chip of claim 24, wherein the encoder circuit further includes a sense amplifier to provide a first output signal and a second output signal based on signals on bit lines, the second output signal being a complement of the first output signal.

26. The chip of claim 25, wherein the encoder circuit further includes a driving transistor coupled to the bus line to provide the encoded signal to the bus line.

27. The chip of claim 26, wherein the encoder circuit further includes a first transmission device to pass the first output signal from the sense amplifier to the driving transistor based on an output of the first flip-flop circuit, and a second transmission device to pass the second output signal from the sense amplifier to the driving transistor based on an output of the first flip-flop circuit.

28. The chip of claim 23, wherein the second flip-flop circuit outputs an unencoded signal based on the clocking signal.

29. The chip of claim 23, wherein the decoder circuit further includes a third flip-flop circuit to store a value corresponding to the output of the second flip-flop circuit.

30. The chip of claim 29, wherein an input to the second flip-flop circuit receives a signal corresponding to an output of the third flip-flop circuit.

31. The dynamic bus of claim 12, wherein an input to the first flip-flop circuit receives a signal corresponding to an output of the second flip-flop circuit.

* * * * *